United States Patent [19]
Lowrey

[11] Patent Number: 5,407,007
[45] Date of Patent: Apr. 18, 1995

[54] MOTORIZED CANISTER AWNING

[75] Inventor: Robert S. Lowrey, 8247 Forest Lake Dr., Conway, S.C. 29526

[73] Assignee: Robert S. Lowery, Myrtle Beach, S.C.

[21] Appl. No.: 68,532

[22] Filed: May 27, 1993

[51] Int. Cl.⁶ .............................................. E04F 10/00
[52] U.S. Cl. ........................................ 160/22; 160/65; 160/71
[58] Field of Search .................. 160/22, 66, 46, 65, 160/71, 80; 135/89

[56] References Cited

U.S. PATENT DOCUMENTS

| | | | |
|---|---|---|---|
| 2,808,065 | 10/1957 | Ellis | 160/46 |
| 3,612,145 | 10/1971 | Darula et al. | 160/67 |
| 4,253,689 | 3/1981 | McKee | 160/67 X |
| 4,615,371 | 10/1986 | Clauss | 160/22 |
| 4,754,774 | 7/1988 | Leader | 160/66 X |
| 5,044,416 | 9/1991 | Murray | 160/22 |

Primary Examiner—David M. Purol

[57] ABSTRACT

A motorized portable awning that can be attached to the side of a utility vehicle. Canopy 16 is made of flexible waterproof material that can be rolled into aluminum canister 18 mounted on the side of the vehicle. Canister 18 also holds aluminum x-brace 10 and leg assembly 12 which when folded out provide support for canopy 16. Canopy 16 is rolled out mechanically by motor 38.

1 Claim, 10 Drawing Sheets

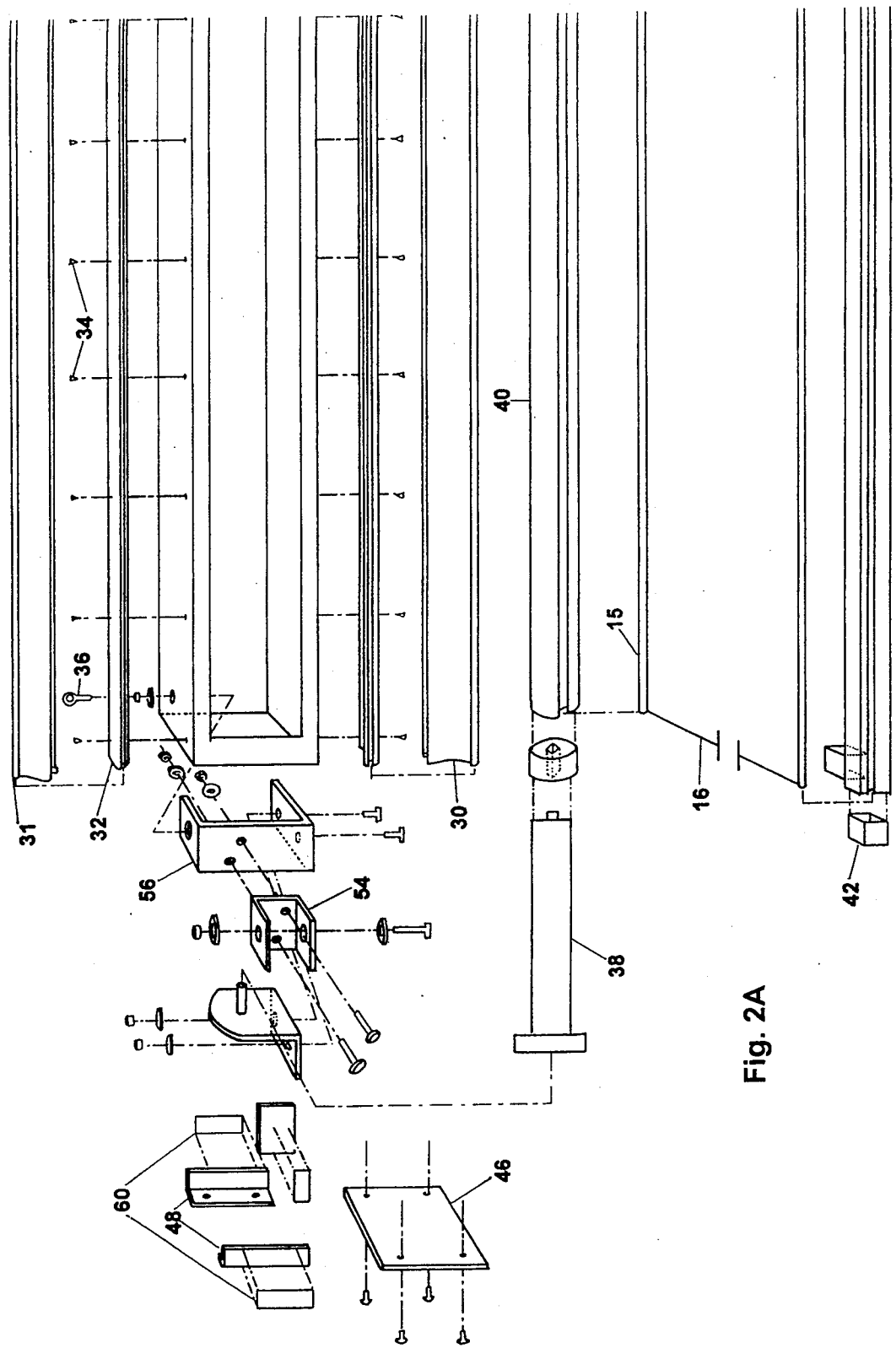

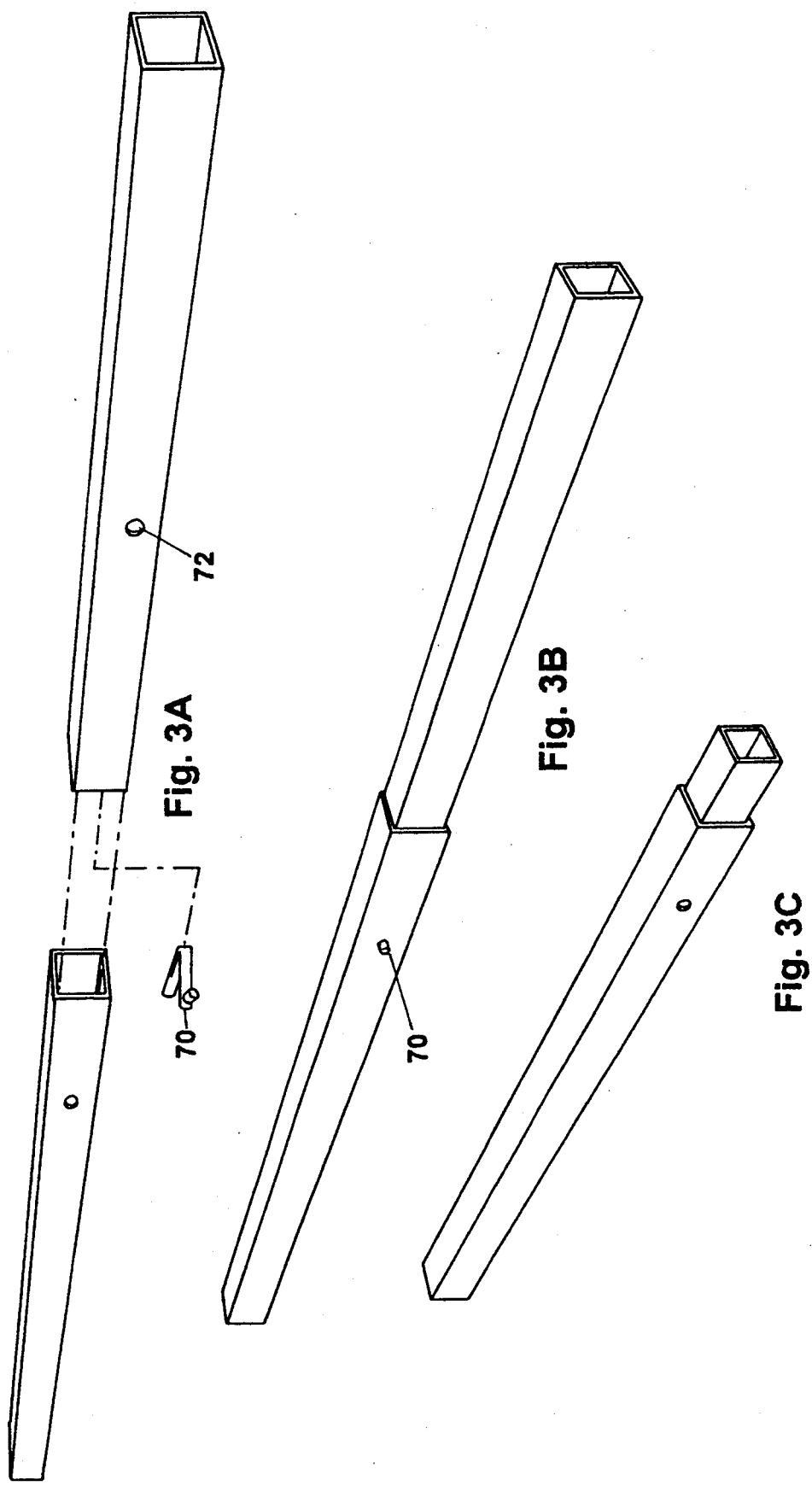

MOTORIZED CANISTER AWNING

BACKGROUND-FIELD OF INVENTION

This invention relates to awnings, specifically to a motorized awning that pulls out from the side of a utility vehicle.

BACKGROUND-DESCRIPTION OF PRIOR ART

Many companies offer services that can be performed from a van. For example, paint repair on cars, windshield repair, mobile tune-ups, and mobile auto upholstery can all be done on-site with a van. However, the success of these businesses is dependent upon favorable weather.

Originally there were some limited ways to overcome unfavorable weather conditions. One of these was to use a *Cover-It shelter*. This was a permanent covering that was stationary and not able to be moved. Thus, you were limited to doing your work in one location.

Another way of overcoming unfavorable weather conditions is a pop-up canopy. This also presented many problems, such as: strong gusts of wind could easily blow it over; it is awkward and clumsy for one person to set up easily; and after a considerable investment in the pop-up canopy, it would only last for a short period of time.

An awning on a camper is also limited because of inherent mechanical limitations. A typical camper awning is only able to extend about 10 feet because of the limited leg size.

On top of this, prior inventions took up much space to store or set-up, and were not reliable in providing portable protection from the elements. Neither were they equipped with a motor for easy setup.

OBJECTS AND ADVANTAGES

Accordingly, several objects and advantages of my invention are:
 (a) to provide a shelter that is portable and lightweight;
 (b) to protect people from the sun;
 (c) to allow people to work in light rain;
 (d) to provide a motorized awning that can be easily setup by one man;
 (e) to provide an awning that can withstand gusts of wind and light rain;
 (f) to provide an awning that will be durable enough to last much longer than previous portable awnings;
 (g) to provide an awning that is attached directly to the van to eliminate the need for storage;
 (h) to provide an awning that has an extension capacity of 15 to 20 feet.

Still further objects and advantages will become apparent from a consideration of the ensuing description and drawings.

DRAWING FIGURES

In the drawings, closely related figures have the same number but different alphabetic suffixes.

FIGS. 2A and 2B shows the exploded view of the awning and canister.

FIGS. 3A to 3C shows the mechanics of the x-brace and leg assembly in three positions.

Figure 1:
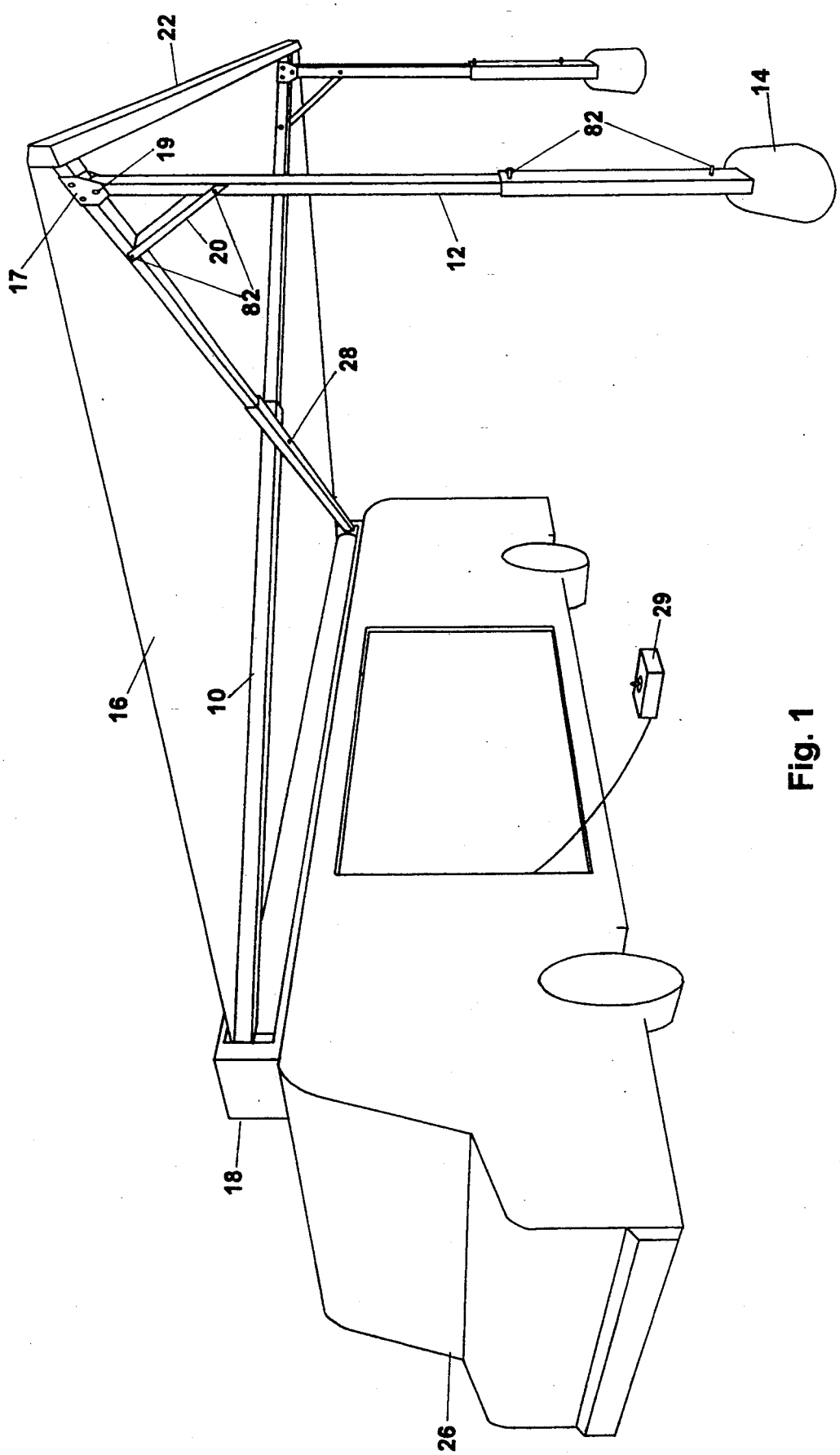
FIG. 1 shows a crossview of a fully extended motorized awning attached to the van.

| Reference Numerals in Drawings | |
|---|---|
| 10 | telescopic X-Brace assembly |
| 12 | telescopic leg assembly |
| 14 | weighted canister anchors |
| 15 | canopy pin |
| 16 | canopy |
| 17 | pivot plate |
| 18 | canister |
| 19 | pivot pin |
| 20 | corner brace |
| 21 | front canopy bar receptacles |
| 22 | front canopy bar |
| 23 | canopy bar slot |
| 24 | x-brace studs |
| 26 | van |
| 28 | wing nut |
| 29 | electric switch box |
| 30 | vinyl zipper cover |
| 31 | vinyl zipper cover bead |
| 32 | vinyl cover rail |
| 34 | rivets |
| 35 | zipper |
| 36 | eye hook bolt |
| 38 | motor |
| 40 | slotted aluminum canopy tube |
| 41 | slot |
| 42 | end plug |
| 46 | end plate |
| 48 | end plate bracket |
| 52 | canopy tube spindle |
| 54 | x-brace pivot hinge |
| 56 | steel support bracket |
| 60 | two sided tape |
| 70 | snap button |
| 72 | hole |
| 80 | weighted canister anchor stud |
| 82 | pins |
| 86 | bolt |

DESCRIPTION-FIG. 1-CROSSVIEW OF FULLY EXTENDED MOTORIZED CANISTER AWNING

A typical embodiment of the motorized canister awning is illustrated in FIG. 1. The awning has a vinyl canopy 16 stretched over a telescopic X-brace assembly 10 with a front canopy bar 22 being slipped over a protruding X-brace 10.

A telescopic leg assembly 12 folds down from X-brace 10 at pivot pin 19. Leg assembly 12 is anchored to a weighted canister anchor 14. A corner brace 20 is placed between telescopic X-brace extension 10 and leg assembly 12 for additional strength.

A canister 18 is permanently mounted to a van 26.

DESCRIPTION-FIGS. 2A AND 2B-EXPLODED VIEW OF THE AWNING AND CANISTER

An x-brace pivot hinge 54 is attached to a steel support bracket 56. A canopy tube spindle 52 is screwed onto steel support bracket 56. This assembly is then installed and bolted into canister 18.

A motor 38 is inserted into a slotted aluminum canopy tube 40. A canopy 16 is inserted into slotted aluminum canopy tube 40 by sliding canopy bead 15 into slot 41.

Canopy 16 is inserted into front canopy bar 22 by sliding canopy bead 15 into front canopy bar slot 23. An end plug 42 is attached to front canopy bar 22.

Motor 38 with canopy assembly is inserted into canopy tube spindle 52.

A vinyl zipper cover 30 is attached to a vinyl cover rail 32 by sliding a vinyl zipper bead 31 into vinyl cover rail 32. This is attached to canister 18 with rivets 34.

End plate bracket 48 with two sided tape 60 is attached to canister plate with screws. This is attached to canister 18. End plate 46 is screwed onto canister 18.

DESCRIPTION-FIG. 3-MECHANICS OF THE X-BRACE AND LEG ASSEMBLY

Snap-button 70 is inserted into both x-brace 10 and leg assembly 12 in FIG. 3A.

FIG. 3B show x-brace 10 and leg assembly 12 fully extended where snap button 70 locks into hole 72.

FIG. 3C is the retracted position where the snap button 70 is released.

DESCRIPTION-FIG. 4-EXPLODED VIEW OF CORNER X-BRACE AND LEG ASSEMBLY

Pivot plate 17 is bolted into x-brace 10 and leg assembly 12. Pins 82 are inserted through corner brace 20 and into x-brace 10 and leg assembly 12.

Leg assembly 12 is inserted over weighted canister anchor stud 80 on weighted canister anchor 14. Pin 82 is inserted into hole 84.

DESCRIPTION-FIG. 5-OVERHEAD VIEW

Figure 5:
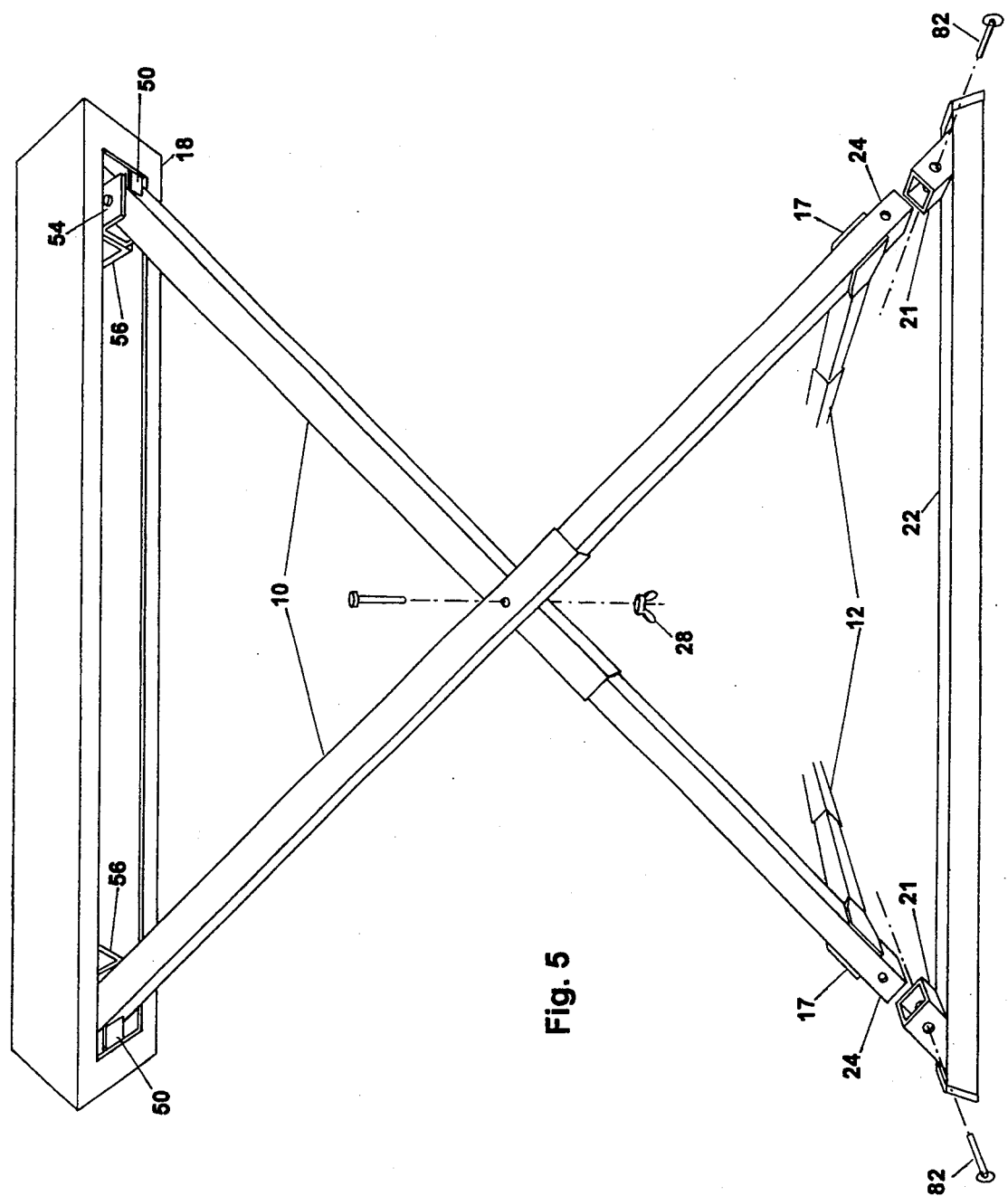
FIG. 5 shows an overhead view of the telescopic x-brace and telescopic leg assembly attached to the van.

FIG. 5 shows an overhead view of the motorized canister awning. X-brace 10 is connected to x-brace pivot hinge 54. Pivot hinge 54 is connected to steel support bracket 56 which is mounted to canister 18. Wing nut 28 holds the two telescopic x-brace assemblies 10 together. Front canopy bar receptacle 21 slide over x-brace stud 24 and secured with pin 82.

DESCRIPTION FIG. 6-CLOSEUP VIEW OF X-BRACE MOUNTED IN X-BRACE PIVOT HINGE

X-brace pivot hinge 54 is attached to steel support bracket 56. X-brace 10 is bolted to x-brace pivot hinge 54. Elongated hole on x-brace pivot hinge 54 allows x-brace 10 to swing freely.

DESCRIPTION-FIG. 7-SIDE VIEW OF CANISTER WITH INSIDES EXPOSED

Steel support bracket 56 is mounted in canister 18 by bolts 86 and eye hook bolt 36. Canopy tube spindle 52 is mounted on steel support bracket 56 by the aforementioned bolts 86. Canopy 16 is mounted on canopy tube spindle 52.

X-brace 10 is mounted by bolts 86 to x-brace pivot hinge 54. Elongated hole on x-brace pivot hinge 54 allows x-brace 10 to swing freely.

DESCRIPTION-FIG. 8 CANOPY IN FULL RETRACTED POSITION AND INSERTED IN CANISTER

Upper and lower x-brace 10 and leg assembly 12 fold and fit into canister 18. X-brace 10 is bolted into x-brace pivot hinge 54 which is attached to steel support bracket 56. Steel support bracket 56 is mounted to canister 18. Vinyl zipper cover 30 is attached to canister 18.

DESCRIPTION-FIG. 9-AWNING IN RETRACTED POSITION WITH COVER CLOSED

Vinyl zipper cover 30 is attached to canister 18 and closed shut with zipper 35. Vinyl zipper cover 30 is attached to vinyl cover rail 32.

FIG. 1 OPERATION OF MOTORIZED CANISTER AWNING

The manner of using the motorized canister awning is as follows. First, weighted canister anchors 14 need to be placed approximately 14 feet from van 26 and 10 feet apart from each other.

Figure 2B:
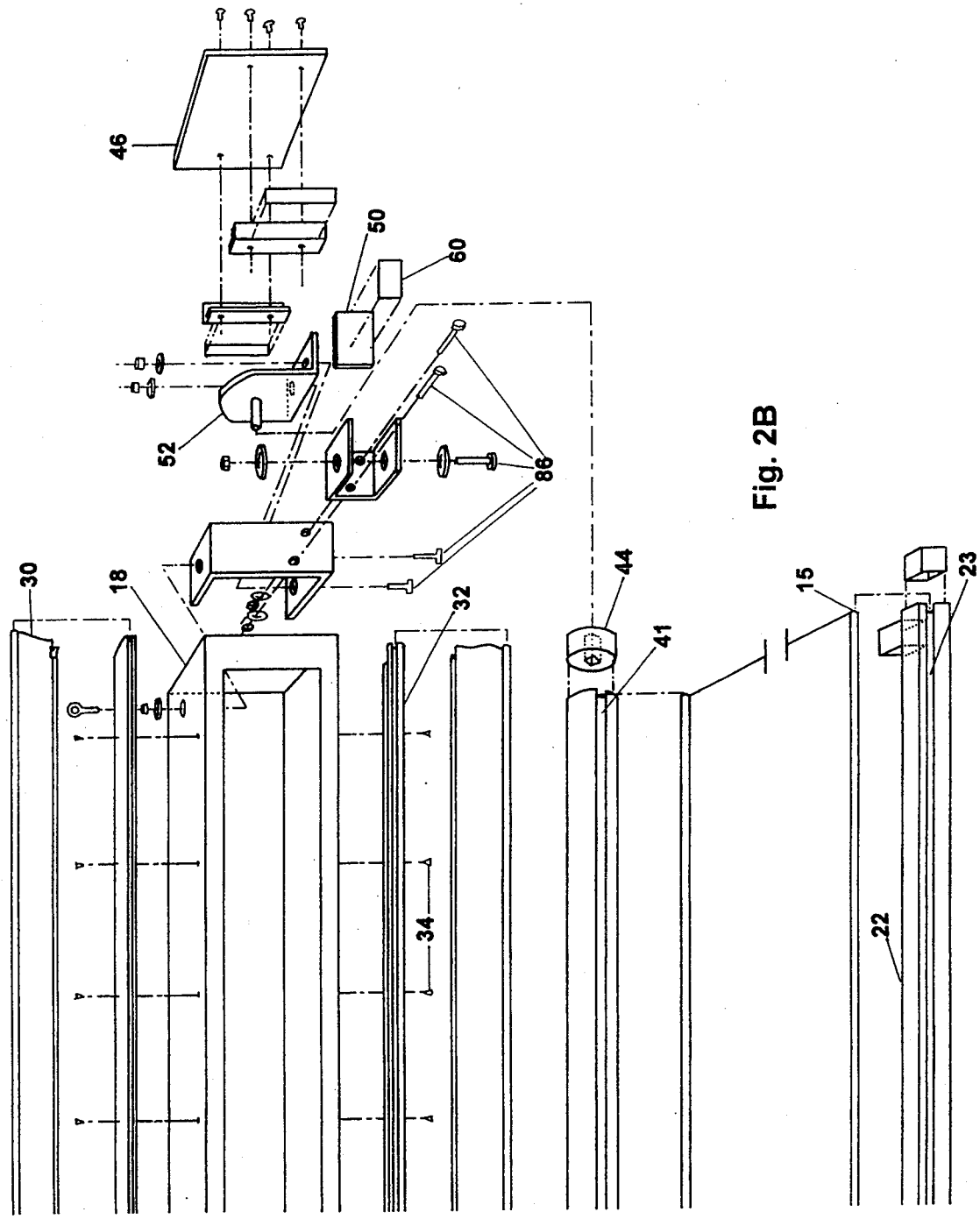
Figure 4:
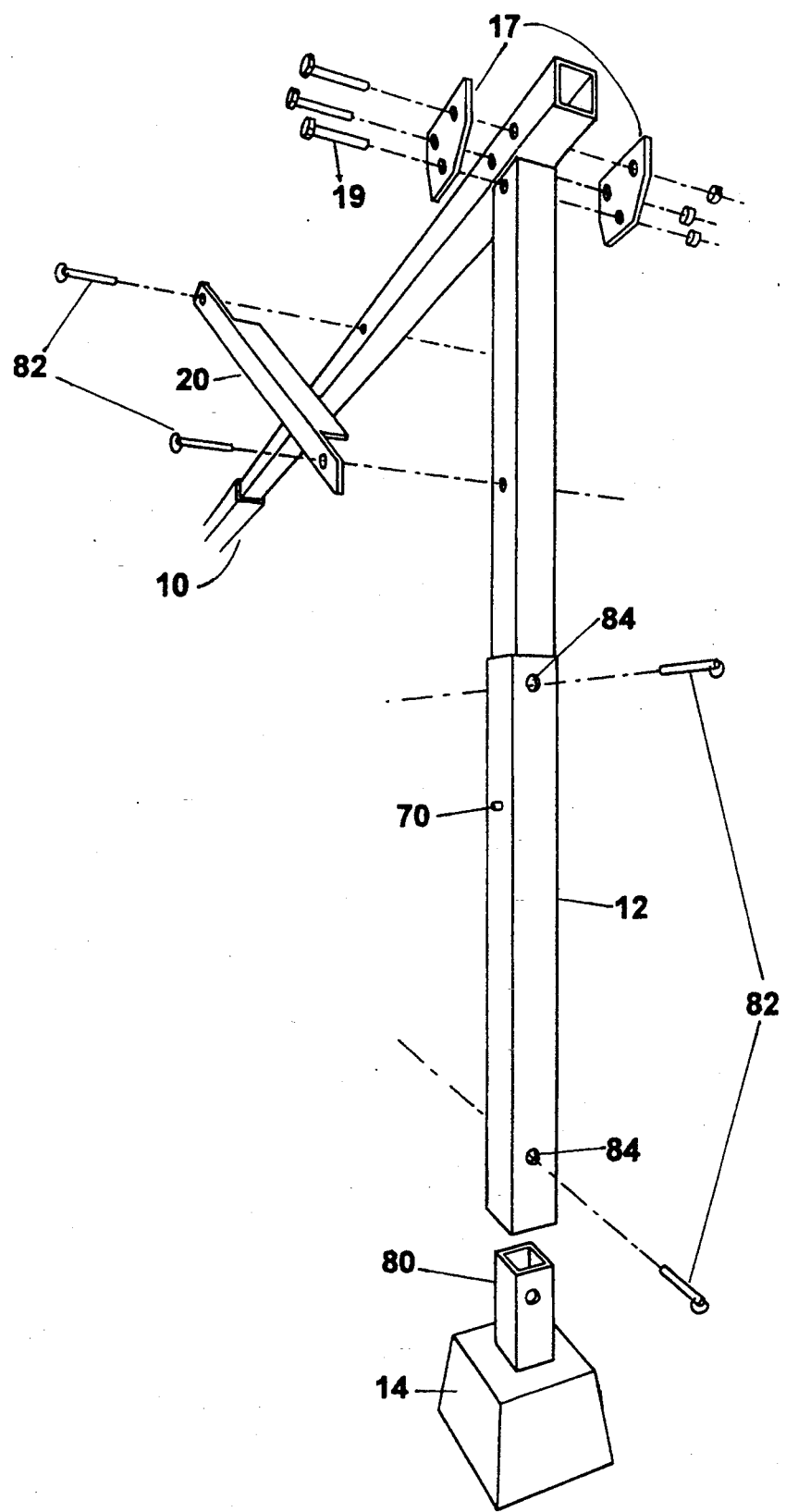
FIG. 4 shows the exploded view of the corner x-brace and leg assembly.

Next, unzip vinyl zipper cover 30 (which can be seen better on FIG. 2) and grab hold of the upper retracted x-brace 10. Pull x-brace 10 to its full length. Snap button 70 will snap in when full extension is reached. Lower leg assembly 12 at pivot plate 17 until perpendicular with x-brace 10. Insert into weighted canister anchor 14 and lock into place with pin 82. Insert pin 82 into leg assembly 12. Repeat the same procedure for the lower x-brace 10 and leg assembly 12.

Walk to center of canister 18 and secure front canopy bar 22 with one hand. Push OUT switch on electric switch box 29 with the other hand. Use both hands to fully extend the canopy 16. Turn switch OFF once canopy 16 is slightly extended over x-brace 10 and leg assembly 12. Insert front canopy bar 22 over x-brace 10.

Push the IN switch on electric switch box 29 until some tension is applied to canopy 16.

Insert wing nut 28 at intersection of two x-braces 10. Secure two corner braces 20 to each x-brace 10 and leg assembly 12. Insert pins 82.

Push the IN switch on electric switch box 29 to make canopy 16 taut.

FIG. 3 OPERATION OF TELESCOPIC X-BRACE AND LEG ASSEMBLY

The x-brace 10 and leg assembly 12 work on the same principle. Pull x-brace 10 or leg assembly 12 until snap button 70 locks into hole 72 for full extension. Push snap button 70 in on x-brace 10 or leg assembly 12 and push x-brace 10 or leg assembly 12 in for retracted position.

FIG. 4 OPERATION OF X-BRACE AND LEG ASSEMBLY

After x-brace 10 has been fully extended, fold leg assembly 12 down at pivot pin 19 until perpendicular to x-brace 10. Insert leg assembly 12 over weighted canister anchor studs 80 and secure with pins 82. Attach corner brace 20 to x-brace 10 and leg assembly 12 Secure with pins 82.

FIG. 5 OPERATION OF FRONT CANOPY BAR AND X-BRACE AND LEG ASSEMBLY

Extend front canopy bar 22 slightly over x-brace 10. Insert front canopy bar receptacles 21 onto x-brace studs 24. Secure with pins 82. Insert wing nut assembly 28 through pre-drilled holes.

Figure 6:
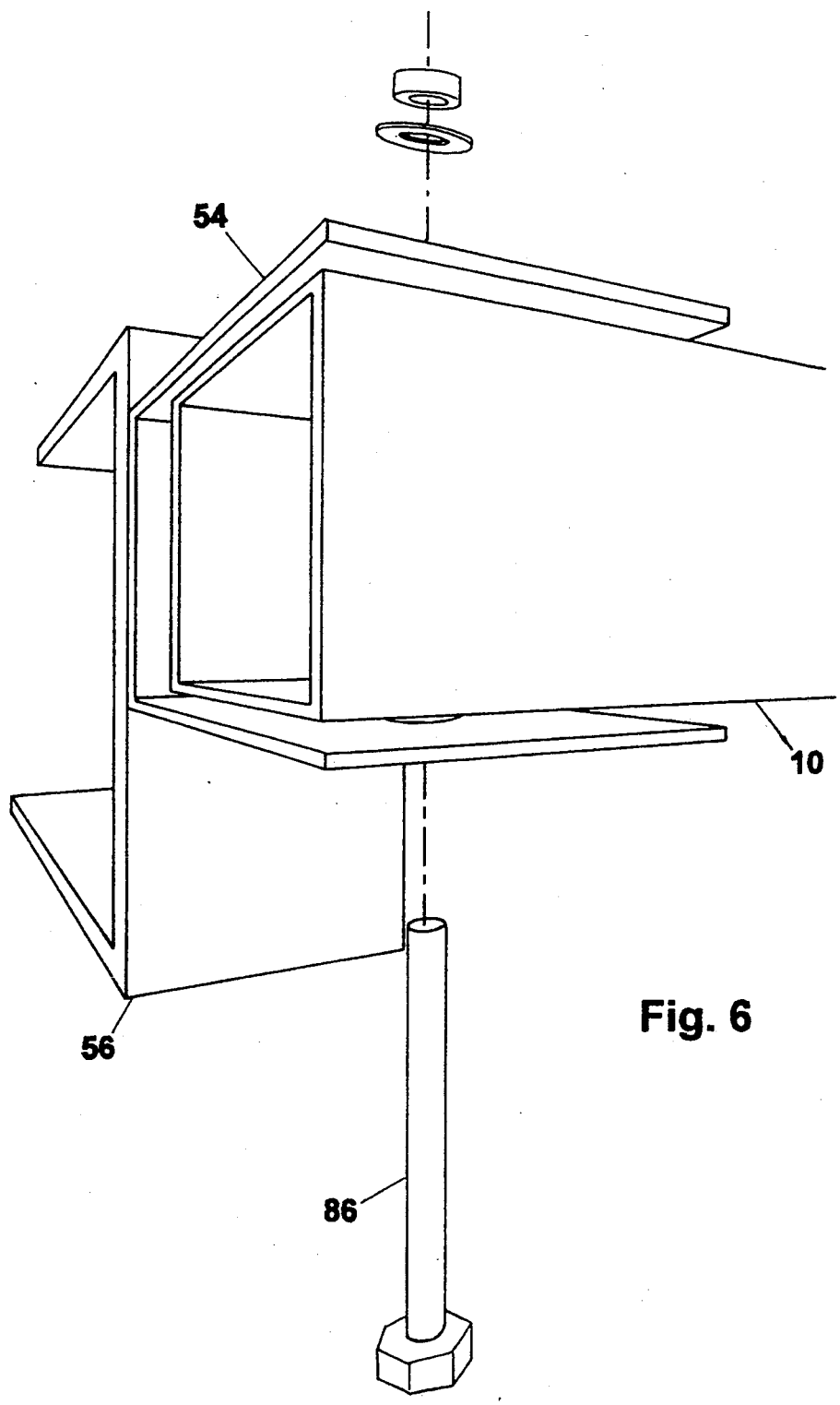
FIG. 6 shows a close-up view of telescopic x-brace mounted in x-brace pivot hinge.
Figure 7:
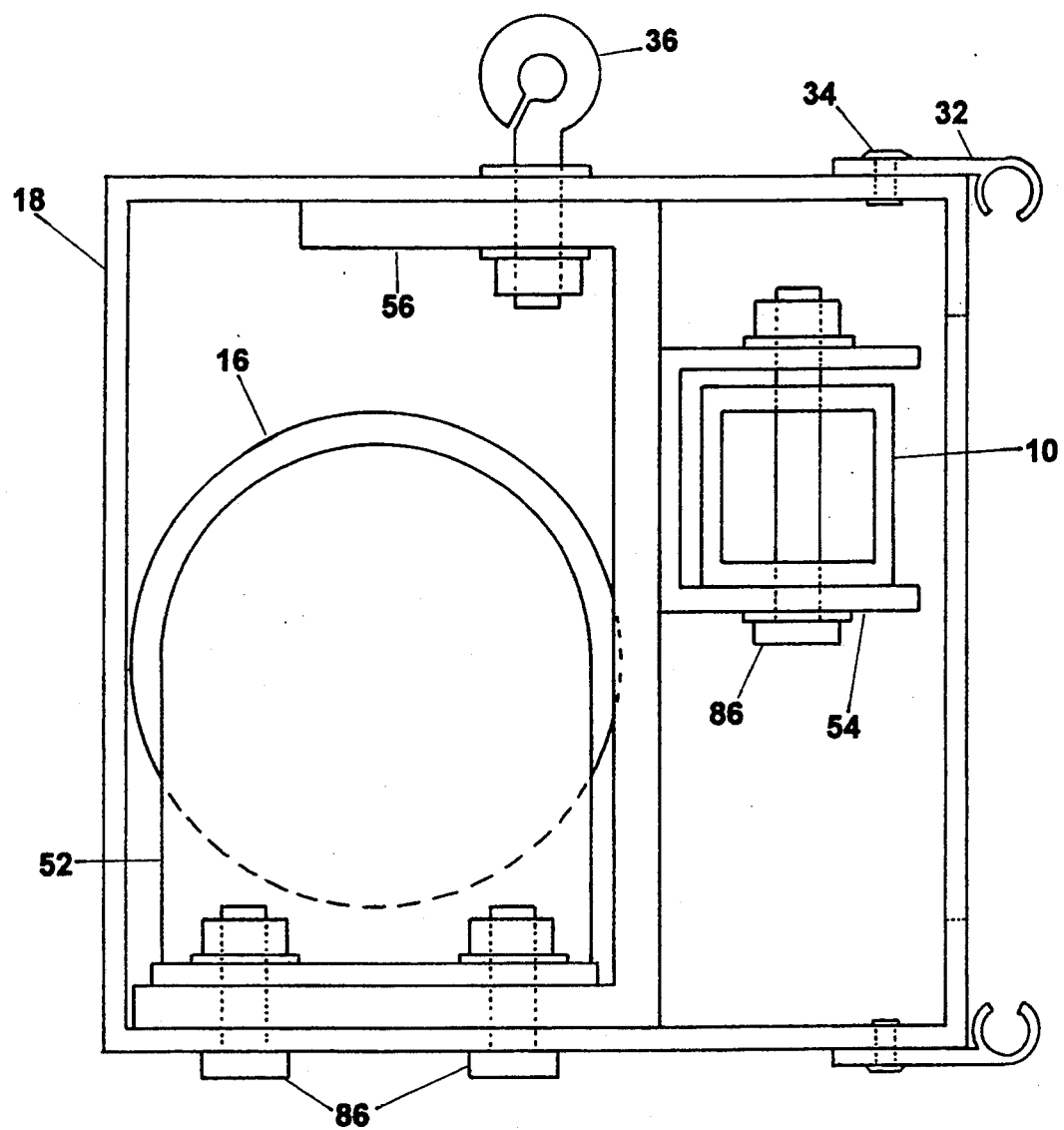
FIG. 7 shows a side view of the canister with the insides exposed.
Figure 8:
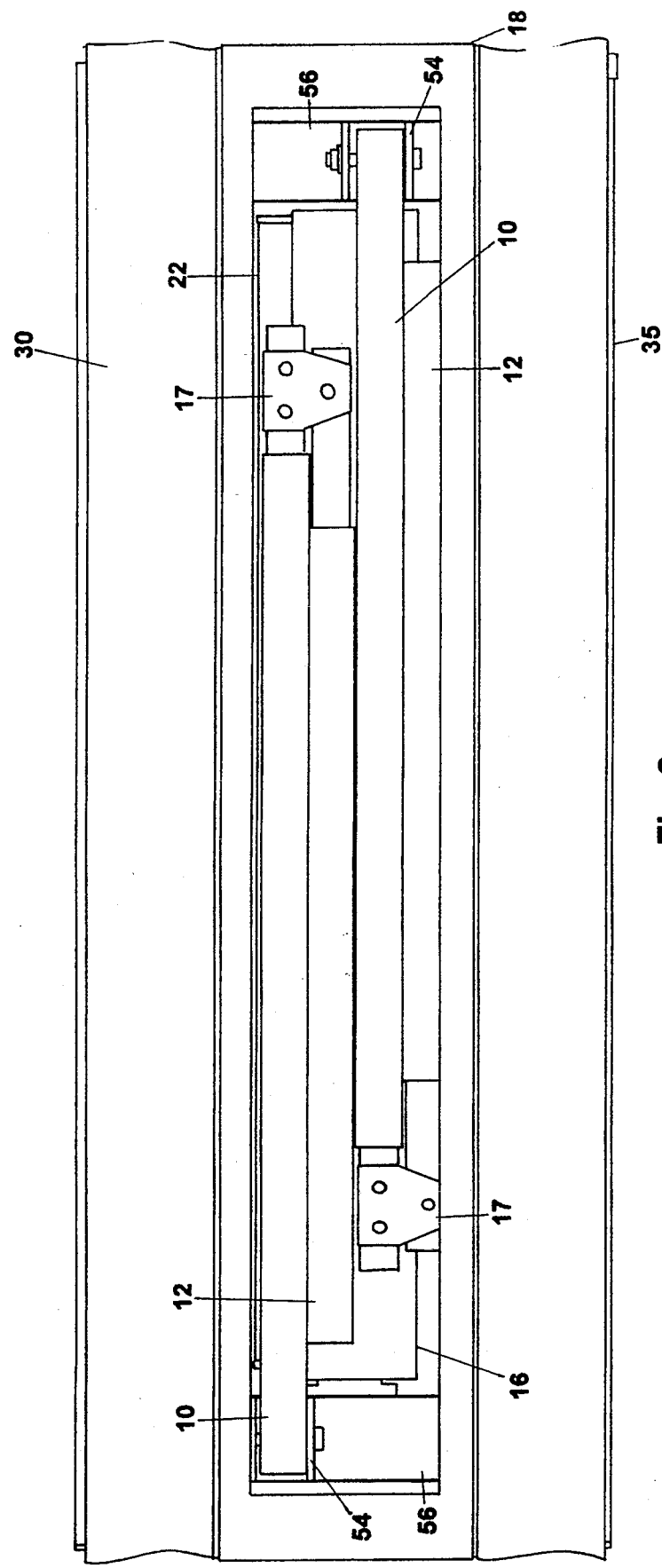
FIG. 8 shows a canopy in full retracted position and inserted in canister.
Figure 9:
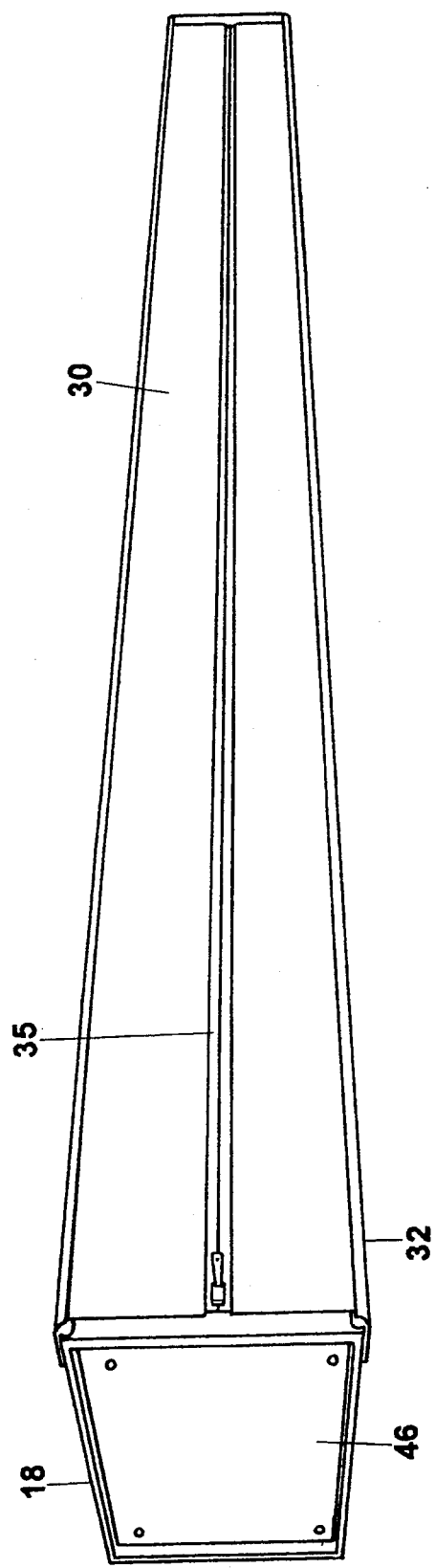
FIG. 9 shows awning in retracted position with zipper cover closed.

FIG. 6 OPERATION OF TELESCOPIC X-BRACE AND LEG ASSEMBLY MOUNTED IN X-BRACE PIVOT HINGE

X-brace 10 swings to an open position on bolt 86 which is inserted through x-brace pivot hinge 54. Elongated hole on x-brace pivot hinge 54 allows x-brace 10 to swing freely.

FIG. 8 OPERATION OF CANOPY IN FULL RETRACTED POSITION

Canopy 16 is rolled into canister 18 until front canopy bar 22 is inside canister 18.

Leg assembly 12 folds into x-brace 10 at pivot plate 17. Leg assembly 10 folds into canister 18 at x-brace pivot hinge 54. The same procedure is repeated for x-brace 10 and leg assembly 12 on the opposite side.

SUMMARY, RAMIFICATIONS, AND SCOPES

Accordingly, the reader will see that the motorized canister awning of this invention can be used as a protection from the elements, is portable, easy to set-up by one man, is long lasting, and has a canopy extension much farther than conventional awnings.

While my above description contains many specifities, these should not be construed as limitation in the scope of the invention, but rather as an exemplification of a preferred embodiment thereof. Many other variations are possible. For example, the size of the canopy awning can be varied according to the vehicle size it is mounted on; the color and material of the canopy can be different, etc.

Thus the scope of the invention should be determined by the appended claims and their legal equivalents, rather than the examples given.

I claim:

1. A motorized awning for a vehicle comprising:

a canister having first and second ends, a canopy tube rotatably mounted within the canister, a motor disposed within the canopy tube for rotating the canopy tube, a canopy having first and second ends with the first end of the canopy secured to the canopy tube for rotation thereon in a first direction into a retracted position and for rotation in a second direction into an extended position, a front canopy bar secured to the second end of said canopy, a first brace member having first and second ends, said first brace member comprising a pair of telescoping members, said first end of said first brace member being pivotally mounted to said first end of said canister, a second brace member having first and second ends, said second brace member comprising a pair of telescoping members, said first and of said second brace member being pivotally mounted to said second end of said canister, a first leg member having first and second ends, said first leg member comprising a pair of telescoping members, said first end of said first leg member being pivotally mounted to said second end of said second brace member, a second leg member having first and second ends, said second leg member comprising a pair of telescoping members, said first end of said second leg member being pivotally mounted to said second end of said first brace member, a first corner brace member having a first and thereof secured approximate the second end of said second brace member and a second and thereof secured approximate the first end of said first leg member, a second corner brace member having a first end thereof secured approximate the second end of said first brace member and a second end thereof secured approximate the first end of said second leg member, a first weighted canister anchor for anchoring the second end of said first leg member, a second weighted canister anchor for anchoring the second end of said second leg member, said first brace member overlying said second brace member when said canopy is in said extended position, and means for securing said first brace member to said second brace member when said first brace member is overlying said second brace member.

* * * * *